(12) United States Patent
Sera

(10) Patent No.: US 6,498,834 B1
(45) Date of Patent: *Dec. 24, 2002

(54) SPEECH INFORMATION COMMUNICATION SYSTEM

(75) Inventor: Takafumi Sera, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/069,791

(22) Filed: Apr. 30, 1998

(30) Foreign Application Priority Data

Apr. 30, 1997 (JP) .............................................. 9-112651

(51) Int. Cl.[7] ........................... H04M 1/64; H04M 11/00
(52) U.S. Cl. .................................................. 379/88.02
(58) Field of Search .......................... 379/67.1, 88.01, 379/88.02, 88.17, 88.19, 93.03, 91.01, 93.12, 93.25, 88.07, 88.11, 88.12, 88.13, 88.05, 88.16, 88.06, 88.08, 88.14, 88.15; 704/203, 234, 246, 260, 243, 251, 273, 270, 272

(56) References Cited

U.S. PATENT DOCUMENTS

| | | | | |
|---|---|---|---|---|
| 4,979,206 A | * | 12/1990 | Padden et al. ............ | 379/88.01 |
| 5,241,649 A | * | 8/1993 | Niyada ........................ | 704/234 |
| 5,414,755 A | * | 5/1995 | Bahler et al. ............. | 379/88.02 |
| 5,465,290 A | * | 11/1995 | Hampton et al. ......... | 379/88.02 |
| 5,675,504 A | * | 10/1997 | Juang et al. ................ | 704/246 |
| 5,680,506 A | * | 10/1997 | Kroon et al. ................ | 704/203 |
| 5,884,262 A | * | 3/1999 | Wise et al. .................. | 704/270 |
| 5,901,214 A | * | 5/1999 | Shaffer et al. .............. | 379/220 |
| 5,911,129 A | * | 6/1999 | Towell ........................ | 704/272 |
| 5,912,952 A | * | 6/1999 | Brendzel .................. | 379/93.25 |
| 5,917,944 A | * | 6/1999 | Wakisaka et al. ........... | 382/190 |
| 5,933,805 A | * | 8/1999 | Boss et al. ................... | 704/249 |
| 5,940,598 A | * | 8/1999 | Strauss et al. ......... | 395/200.79 |
| 6,018,710 A | * | 1/2000 | Wynblatt et al. ............ | 704/260 |
| 6,208,959 B1 | * | 3/2001 | Jonsson et al. ............. | 704/209 |
| 6,226,361 B1 | * | 5/2001 | Koyama ................... | 379/88.07 |

FOREIGN PATENT DOCUMENTS

| | | |
|---|---|---|
| JP | 60-136450 | 7/1985 |
| JP | 61-71730 | 4/1986 |
| JP | 63-131193 | 6/1988 |
| JP | 63-138850 | 6/1988 |
| JP | 2-20148 | 1/1990 |
| JP | 2-87752 | 3/1990 |
| JP | 4-349747 | 12/1992 |
| JP | 7-175495 | 7/1995 |
| JP | 8-242280 | 9/1996 |
| JP | 10-257167 | 9/1998 |

* cited by examiner

*Primary Examiner*—Allan Hoosain
(74) *Attorney, Agent, or Firm*—Foley & Lardner

(57) ABSTRACT

A speech information communication system includes a speech recognizer which converts an input speech signal to character code information and speech feature information. The character code information and the speech feature information are transmitted to a receiving side where the received character code information is converted to an output speech signal depending on the received speech feature information.

20 Claims, 5 Drawing Sheets

SPEECH INFORMATION COMMUNICATION SYSTEM

BACKGROUND OF THE INVENTION

1. Field of the Invention

The present invention generally relates to communication systems, and in particular to a communication system and method for speech information.

2. Description of the Related Art

A widely used one of telecommunications systems is an analog system which uses analog signals to represent information, for example, the classic, voice-based telephone system which is being replaced by the digital communications system. Since digital signals are easily stored and copied, various services including voice message can be provided.

In the case of digital voice communications, transmission of a large amount of voice data may cause delay during interactive conversation between users. In general, users do not tolerate appreciable delay. To overcome such a delay problem, there have been proposed several systems employing speech recognition and speech synthesis techniques.

In Japanese Patent Unexamined Publication No. 60-136450, the digital speech data is converted into character code information by means of speech recognition technique. The character code information is transferred to the destination where the received character code Information is converted back to speech data by means of speech synthesis technique. Since the amount of character code information is munch smaller than that of digital speech data, the real-time interactive conversation may be achieved.

However, since the character code information is converted to the speech data by the speech synthesizer at the receiving side, the same voice reproduced even if different users speak at the sending side. Therefore, the receiver cannot know who is calling. Further, it is difficult to know that a calling party is a different person using a registered name or password.

SUMMARY OF THE INVENTION

An object of the present invention is to provide a speech information communication system and method which can easily identify who is calling.

Another object of the present Invention is to provide a speech information communication system and method which can screen calling parties to desired registration data.

According to the present invention, an input speech signal is converted to character code information and speech feature information which are transmitted to a receiving side where they are combined to produce an output signal. In other words, a first converter converts an input speech signal to character code information and speech feature information. The character code Information and the speech feature information are transmitted to a transmission line. A receiver receives character code information and speech feature information from the transmission line and a second converter converts received character code information to an output signal depending on received speech feature information.

According to another aspect of the present invention, the second converter may convert received character code information to an output display signal for displaying the received character code information on screen depending on received speech feature information.

Since the character code information and the speech feature information are both transmitted to the receiving side where they are combined to produce the output signal, the amount of transmission data is reduced and a receiving user can easily identify who is calling.

DETAILED DESCRIPTION OF THE PREFERRED EMBODIMENTS

Hereinafter, assuming for simplicity that a speech communication system is comprised of a sending side and a receiving side which are connected through a transmission line. The transmission line may include radio transmission. If such a speech communication system Is also provided in opposite direction. two-way real-time speech communication would be performed as in the case of existing digital or analog telephone network system.

FIRST EMBODIMENT

Figure 1:
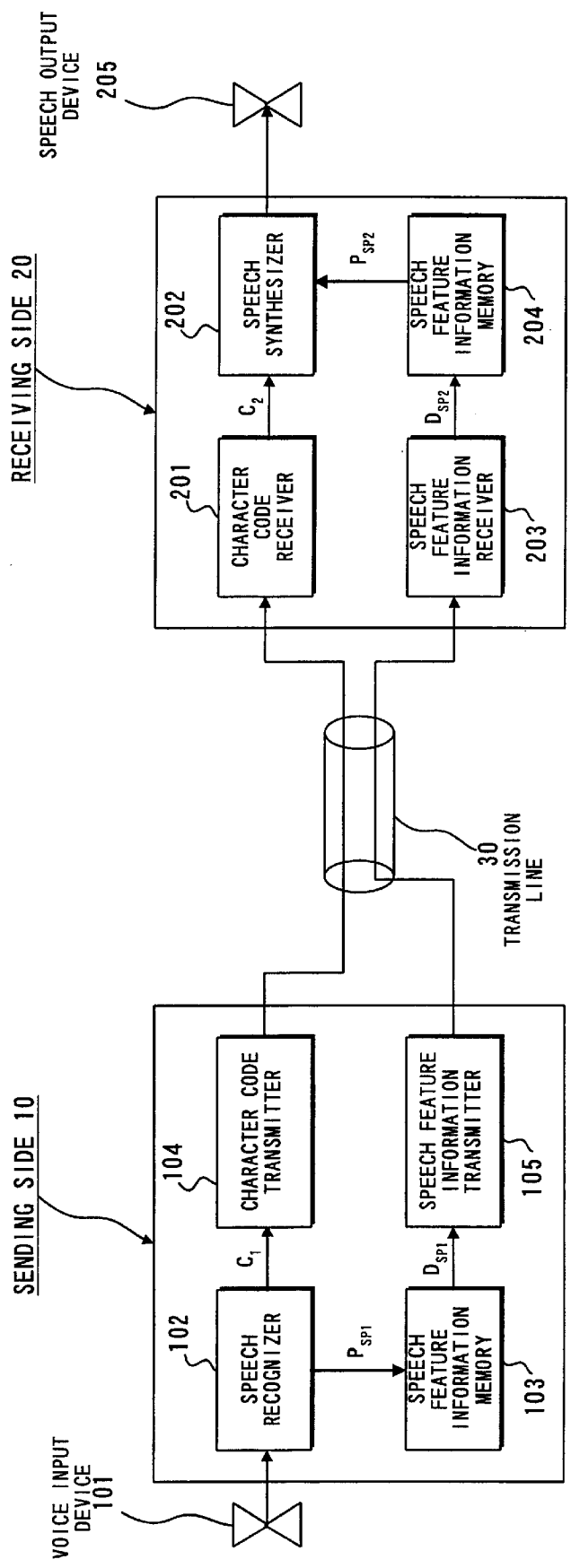
FIG. 1 is a block diagram showing a speech information communication system according to a first embodiment of the present invention.

Referring to FIG. 1, a speech communication system is comprised of d sending side 10 and a receiving side 20 which are contacted through a transmission line 30. The transmission line 30 may be set up in, for example, an integrated services digital network (ISDN).

The sending side 10 includes a voice input device 101 such as a microphone which is connected to a speech recognizer 102. When receiving speech signals from the voice input device 101, the speech recognizer 102 converts them to digital speech signals and then performs speech recognition. More specifically, the speech recognizer 102 converts the digital speech signals to character code information $C_1$ corresponding to recognized words and extracts the speech feature parameters $P_{SP1}$ from the digital speech signals.

The speech feature parameters $P_{SP1}$ include vocal tract feature and speed which may be used to synthesize the imitated voice of the speaker. Therefore, when the speech feature parameters are determined, the extracted speech feature parameters $P_{SP1}$ are stored onto a speech feature information memory 103 from which speech feature information $D_{SP1}$ is read as transmission data. Once the speech feature parameters $P_{SP1}$ have been determined, the speech feature information memory 103 may not be updated until the communication is terminated.

The character code information $C_1$ is output to a character code transmitter 104 and the speech feature information $D_{SP1}$ is output to a speech feature information transmitter 105. The character code transmitter 104 and the speech feature information transmitter 105 my be provided with an encoder which encodes input data to produce an encoded signal suitable for the transmission line 30.

The respective transmit signals of the character code information $C_1$ and the speech feature information $D_{SP1}$ are transmitted over the transmission line 30 to the receiving side 20. For example, after transmitting the transmit signal of the speech feature information $D_{SP1}$ has been transmitted, the transmit signal of the character code information $C_1$ is transmitted. The transmit signals of the character code information $C_1$ and the speech feature information $D_{SP1}$ may by concurrently transmitted.

The receiving side 20 is provided with a character code receiver 201 and a speech feature information receiver 203. The character code receiver 201 decodes character code Information $C_2$ which is output to a speech synthesizer 202. The speech feature information receiver 203 decodes speech feature information $D_{SP2}$ which is stored onto a speech feature information memory 204.

The speech synthesizer 202 synthesizes speech signals from the character code information $C_2$ and the speech feature parameters $P_{SF3}$ which are received from the character code receiver 201 and the speech feature information memory 204, respectively. More specifically, after the speech feature parameters $P_{SP2}$ have been stored onto the speech feature information memory 204, the speech synthesizer 202 produces words from the character code information $C_2$ and then synthesizes voice signals of spoken words depending on the speech feature parameters $P_{SP2}$. The speech signals representing the spoken words are output to a speech output device such as a speaker which reproduces the imitated voice input by the voice input device 101 of the sending side 10.

In this manner. the input spoken words are converted to character code information and speech feature information which are transmitted to the receiving side 20 where they are combined to reproduce the imitated input spoken voice. Therefore, voice communication is achieved with a relatively small amount of transmission data. Further, the receiver can know easily who is calling.

SECOND EMBODIMENT

Figure 2:
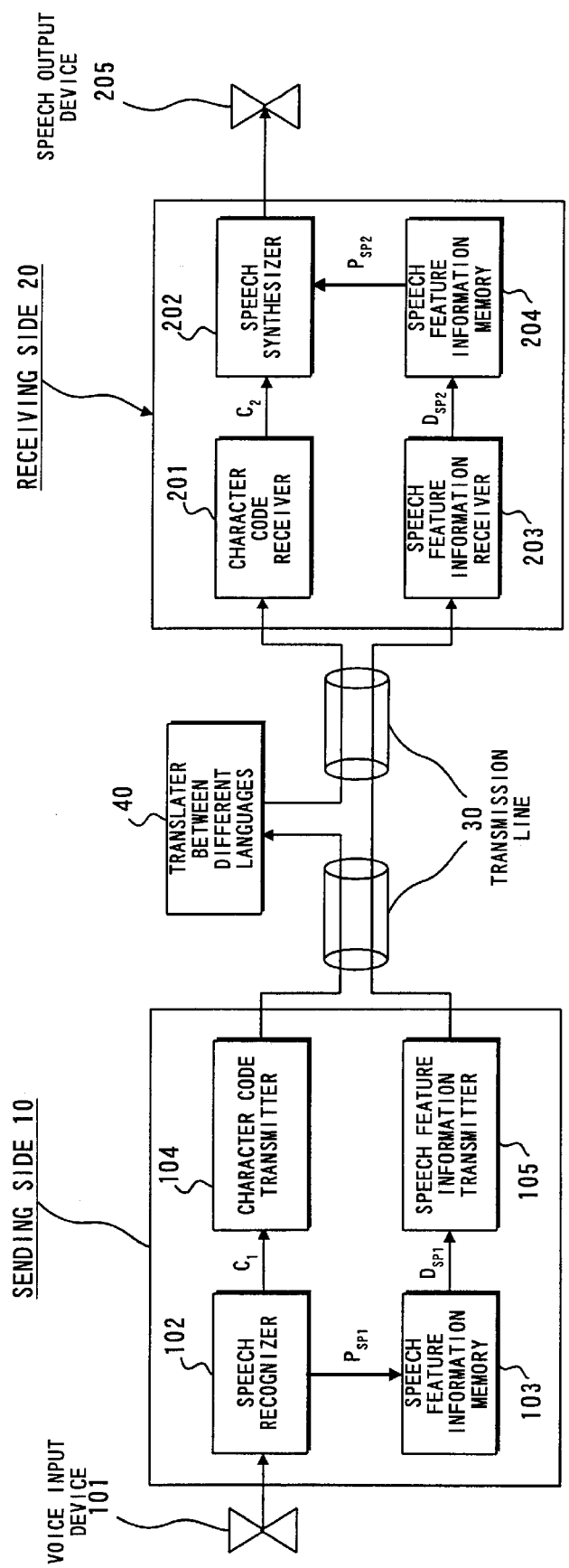
FIG. 2 is a block diagram showing a speech information communication system according to a second embodiment of the present invention.

Referring to FIG. 2, where blocks similar to those previously described with reference to FIG. 1 are denoted by the same reference numerals, a translator 40 is provided between the sending side 10 and the receiving side 20. Since the operations of the sending side 10 and the receiving side 20 are similar to the case of FIG. 1, the descriptions are omitted.

The translator 40 is provided in, for example, a service center or a switching node of the switched telephone network. The translator 40 translates the character code information $C_1$ from the input language at the sending side 10 to the output language at the receiving side 20.

The translator 40 transmits the character code information $C_2$ of the translated language to the receiving side 20. The speech feature information $D_{SP1}$ is transmitted to the receiving side 20 as it is. Therefore, the output voice reproduced by the voice output device 205 is different in language from the input voice but the speech feature of the output voice is the same as that of the input voice.

THIRD EMBODIMENT

Figure 3:
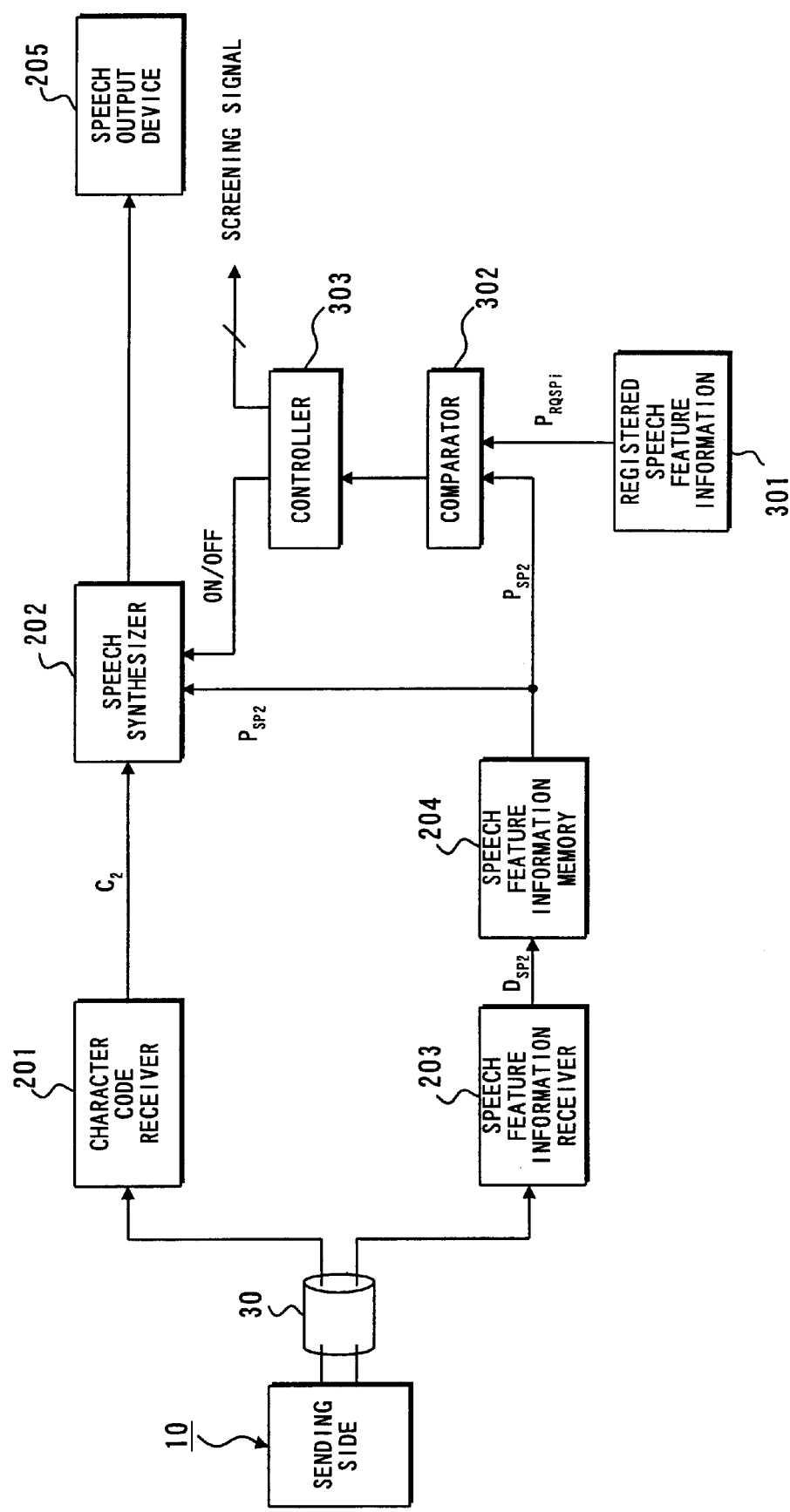
FIG. 3 is a block diagram showing a speech information communication system according to a third embodiment of the present invention.

Referring to FIG. 3, where blocks similar to those previously described with reference to FIG. 1 are denoted by the name reference numerals, the receiving side 20 is provided with a speech feature check section comprising a memory 301, a comparator 302 and a controller 303.

The memory 301 stores one or more sets of previously registered speech feature parameters, each set representing the voice feature of a known person. The comparator 302 and the controller 303 form a searcher which searches the memory 301 for the received speech feature information $D_{SP1}$.

As described before, the speech feature information receiver 203 decodes the speech feature information $D_{SP2}$ which is stored onto the speech feature information memory 204. A set of the speech feature parameters $P_{SP2}$ is read from the memory 204 and is output to the speech synthesizer 202 as well as the comparator 302.

The comparator 302 compares the received set of speech feature parameters $P_{SP2}$ one by one with the registered sets stored in the memory 301. If a match is found with one of the registered sets, the controller 303 controls the speech synthesizer 202 so that the speech synthesizer 202 synthesizes speech signals from the character code information $C_2$ and the speech feature parameters $P_{SP2}$ which are received from the character code receiver 201 and the speech feature information memory 204, respectively.

More specifically, the speech synthesizer 202 produces words from the character code information $C_2$ and then synthesizes sound signals of spoken words depending on the speech feature parameters $P_{SP2}$. The speech signals representing the spoken words are output to the speech output device 205 which reproduces the imitated voice input by the voice input device 101 of the sending side 10.

On the other hand, if no match exists in the memory 301, the controller 303 outputs a screening signal or a mismatch signal to other sections so as to disconnect the current connection line to the sending side 10 and to perform other necessary steps including disconnection notice.

In this manner, calling parties can be screened to the registered speech feature parameters stored In the memory 301.

FOURTH EMBODIMENT

Figure 4:
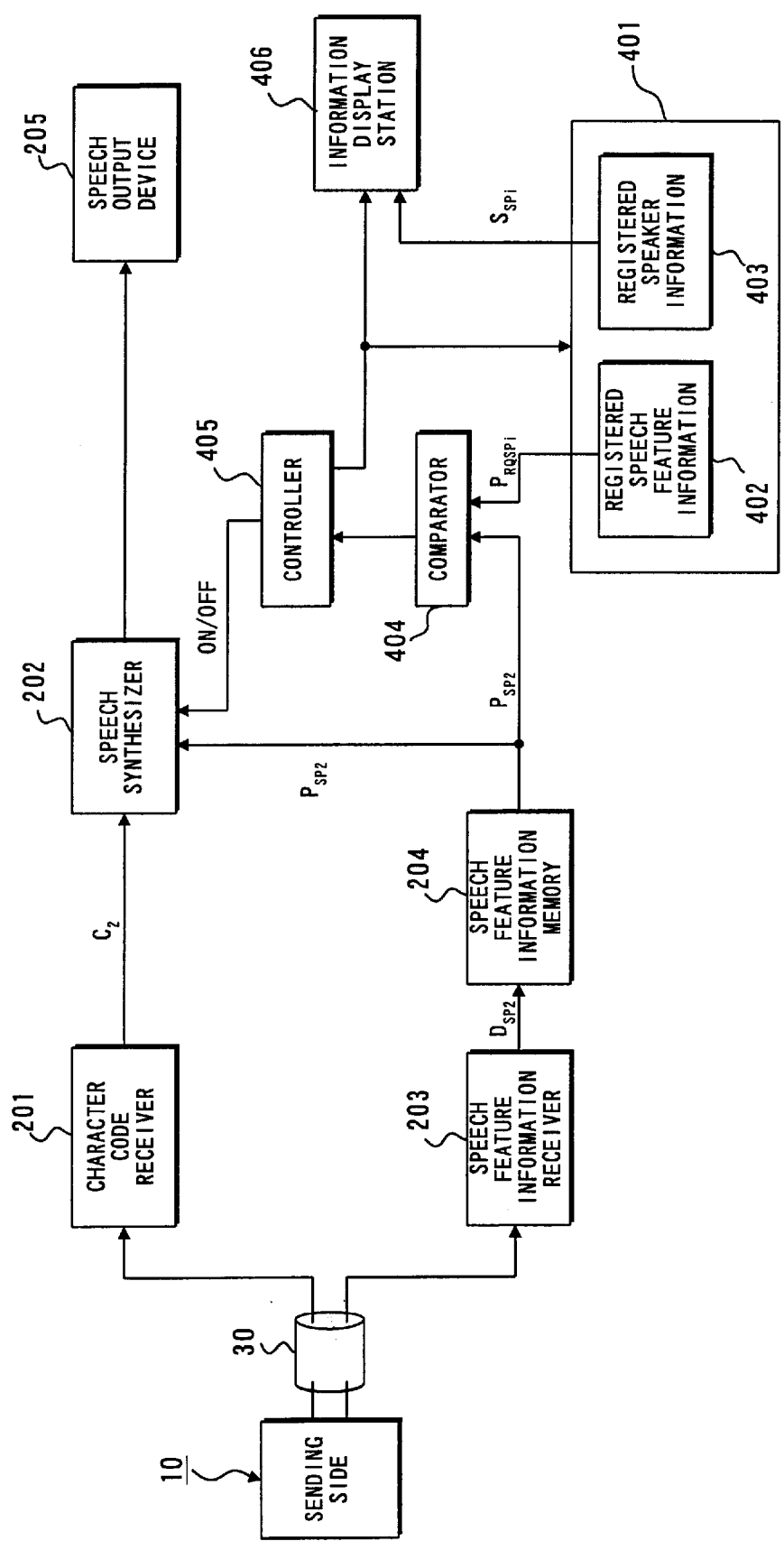
FIG. 4 is a block diagram showing a speech information communication system according to a fourth embodiment of the present invention.

Referring to FIG. 4, where blocks similar to those previously described with reference to FIG. 1 are denoted by the same reference numerals, the receiving side 20 is provided with a speech feature check section and an information display section.

The speech feature check section includes a memory 401 having a registered speech feature information area 402 and a registered speaker information area 403. The registered speech feature information area 402 stores one or more sets of previously registered speech feature parameters, each set representing the voice feature of a registered person. The registered speaker information area 403 stores the information of the registered persons. Further, a comparator 404 and a controller 405 form a searcher which searches the registered speech feature information are 402 for the received speech feature information $D_{SP2}$.

As described before, the speech feature information receiver 203 decodes the speech feature information $D_{SP2}$ which is stored onto the speech feature information memory 204. A set of the speech feature parameters $P_{SP2}$ is read from the memory 204 and is output to the speech synthesizer 202 as well as the comparator 404.

The comparator 404 compares the received set of speech feature parameters $P_{SP3}$ one by one with the registered sets stored in the registered speech feature information area 402.

If a match is found with one of the registered sets, the controller 405 controls the speech synthesizer 202 so that the speech synthesizer 202 synthesizes speech signals from the character code information $C_1$ and the speech feature parameters $PSP_2$ which are received from the character code receiver 201 and the speech feature information memory 204, respectively. Further, the controller 405 controls the memory 401 and the information display section 406 so that the person's information corresponding to the found registered set is read from the registered speaker information area 403 and it is displayed on screen of the information display section 406. Therefore, the receiving user can easily know who is calling before communicating with the calling party.

On the other hand, if no match exists in the registered speech feature information area 402, the controller 405 outputs a mismatch signal to the speech synthesizer 202 so that the speech synthesizer 202 is stopped operating. Further, the controller 405 may display a message on the information display section 406 so that the receiving user can be informed that an unknown person is calling.

In this manner, calling parties can be screened to the registered speech feature parameters stored in the memory 301 and further the receiving user can be informed who is calling before communicating with the calling party.

FIFTH EMBODIMENT

Figure 5:
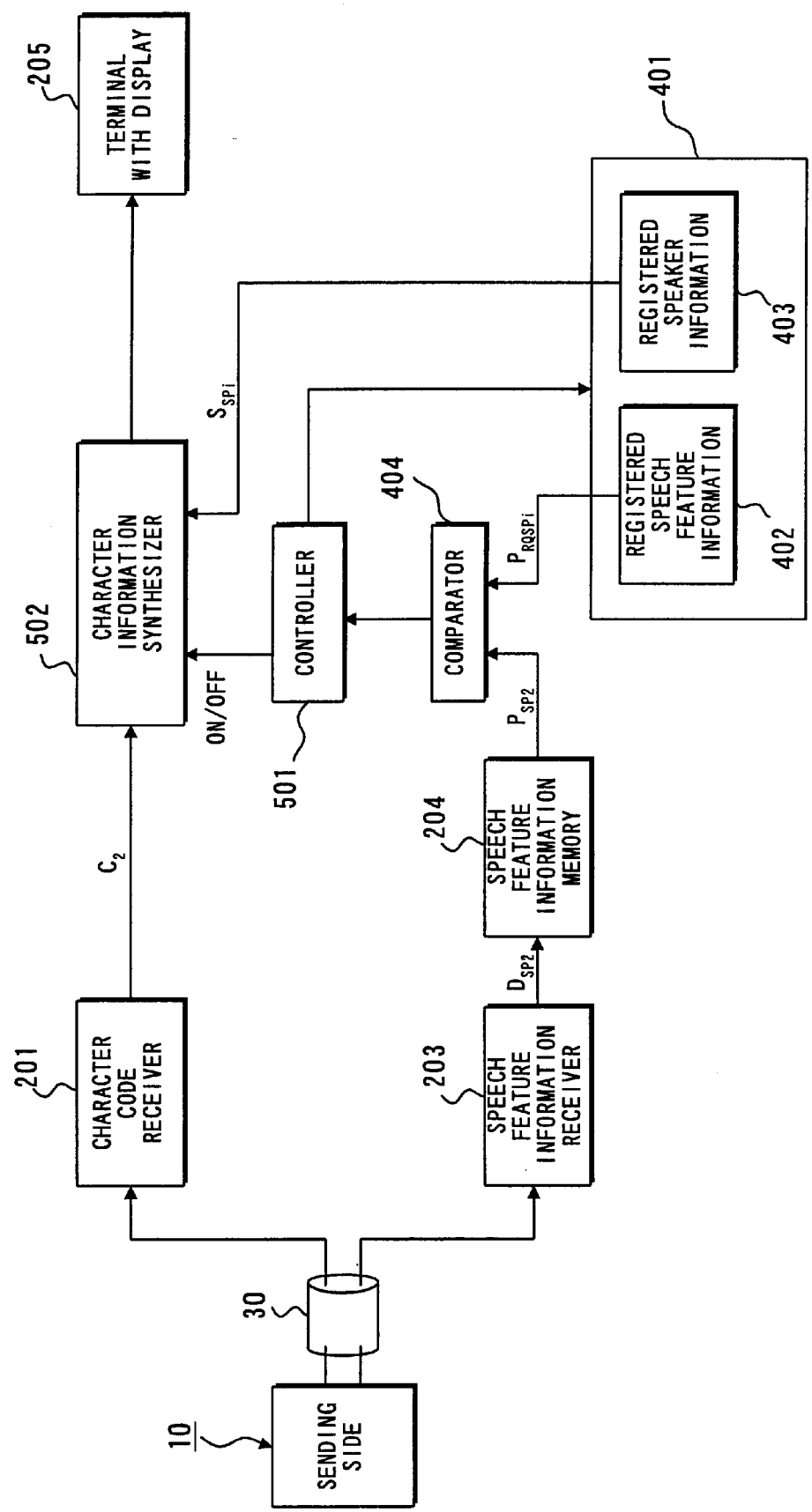
FIG. 5 is a block diagram showing a speech information communication system according to a fifth embodiment of the present invention.

Referring to FIG. 5, where blocks similar to those previously described with reference to FIG. 4 are denoted by the same reference numerals the receiving side 20 is provided with a controller 501, a character information synthesizer 502 and a terminal 503. In this embodiment, the terminal 503 is a personal computer or the like which is capable of displaying character information on screen.

The receiving side 20 is provided with a memory 401 having a registered speech feature information area 402 and a registered speaker information area 403. The registered speech feature information area 402 stores on or more sets of previously registered speech feature parameters each set representing the voice feature of a known person. The registered speaker information area 403 stores the information of the registered persons. Further, a comparator 404 and the controller 501 form a searcher which searches the registered speech feature information area 402 for the received speech feature information $D_{SP2}$.

A set of the speech feature parameters $P_{SP2}$ is read from the memory 204 and is output to the comparator 404. The comparator 404 compares the received set of speech feature parameters $P_{SP2}$ one by one with the registered sets stored in the registered speech feature information area 402.

If a match is found with one of the registered sets, the controller 501 reads the person's information $S_{SP1}$ corresponding to the found registered set from the registered speaker information area 403 of the memory 401 and transfers it to the character information synthesizer 502. The character information synthesizer 502 synthesizes display information from the character code information $C_2$ and the person's information $S_{SP1}$ which are received from the character code receiver 201 and the registered speaker information area 403, respectively. More specifically, the character information synthesizer 502 produces display word character data from the character code information $C_2$ and further display character data from the person's information $S_{SP1}$. Therefore, the receiving user can easily know who is calling and what is the contents of communication by looking at the display.

On the other hand, if no match exists in the registered speech feature information area 402, the controller 405 outputs a mismatch signal to the speech synthesizer 202 so that the speech synthesizer 202 is stopped operating. Further, the controller 405 may display a message on the display of the terminal 503 so that the receiving user can be informed that an unknown person is calling.

What is claimed is:

1. A system comprising:
   a first converter for converting an input speech signal to character code information representative of recognized words of said input speech signal and speech feature information representative of user specific speech characteristics of a speaker generating said input speech signal, said user specific speech characteristics comprising a vocal tract feature of the speaker and a speed of the speech of the speaker;
   a character code transmitter for transmitting the character code information to a transmission line;
   a speech feature information transmitter for transmitting the speech feature information to a transmission line;
   a receiver for receiving character code information corresponding to said recognized words and speech feature information from the transmission line; and
   a second converter for converting received character code information and speech information to an output speech signal corresponding to said recognized words and having audible speech characteristics substantially identical to the content of said input speech signal and the user specific speech characteristics of said speaker.

2. The system according to claim 1, wherein the first converter comprises:
   a speech recognizer for recognizing the input speech signal to produce the character code information representative of said recognized words and the speech feature information of said speaker.

3. The system according to claim 1, wherein the receiver comprises:
   a first receiver for receiving the character code information from the transmission line; and
   a second receiver for receiving the speech feature information from the transmission line.

4. The system according to claim 1, wherein the second converter comprises:
   a speech synthesizer for synthesizing said output speech signal from the received character code information and the received speech feature information.

5. The system according to claim 1, further comprising:
   a memory for storing at least one piece of registered speech feature information;
   a searcher for searching the memory for the received speech feature information; and
   a controller for producing a screening signal.

6. The system according to claim 5, wherein the controller disconnects communication between the transmitter and the receiver when no match is found.

7. The system according to claim 5, further comprising:
   a translator provided between the character code transmitter and the receiver, for translating the character code information from a first language of the input speech signal to a second language of the output speech signal.

8. The system according to claim 1, further comprising:
   a display;
   a memory for storing at least one piece of registered speech feature information and at least one piece of registered speaker information which correspond to each other;

a searcher for searching the memory for a match between the received speech feature information and the registered speech feature information; and a controller for controlling the display such that, when a match is found in the memory, registered speaker information corresponding to the matched registered speech feature information is displayed on said display.

9. The system according to claim 8, wherein the controller further disconnects communication between the transmitter and the receiver whether no match is found.

10. The system according to claim 8, further comprising:
a translator provided between the character code transmitter and the receiver, for translating the character code information from a first language of the input speech signal to a second language of the output speech signal.

11. The system according to claim 1, further comprising:
a translator provided between the character code transmitter and the receiver, for translating the character code information from a first language of the input speech signal to a second language of the output speech signal.

12. A method for transmitting speech information from a sending side to a receiving side, comprising the steps of:
at the sending side,
converting an input speech signal to character code information representative of recognized words of said input speech signal and speech feature information representative of user specific speech characteristics of a speaker generating said input speech signal, said user specific speech characteristics comprising a vocal tract feature of the speaker and a speed of the speech of the speaker; and
transmitting the character code information from a character code transmitter to a transmission line,
transmitting the speech feature information from a speech feature transmitter to the transmission line, and
at the receiving side,
receiving character code information corresponding to said recognized words and speech feature information from the transmission line; and
converting received character code information and speech feature information to an output speech signal corresponding to said recognized words and having audible speech characteristics substantially identical to the content of said input speech signal and the user specific speech characteristics of said speaker.

13. The method to claim 12, further comprising the steps of:
storing at least one piece of registered speech feature information onto a memory;
searching the memory for a match between the registered speech feature information and the received speech feature information; and
producing a screening signal to a display depending on whether a match is found in the memory.

14. The method according to claim 13, further comprising the step of disconnecting communication between the transmitting side and the receiving side whether no match is found.

15. The method according to claim 12, further comprising the steps of:
storing at least one piece of registered speech feature information and at least one piece of registered speaker information which correspond to each other onto a memory;
searching the memory for a match between the registered speech feature information and the received speech feature information; and
controlling a display in a manner that, when a match is found in the memory, registered speaker information corresponding to the matched registered speech feature information said display.

16. The method according to claim 12, further comprising the steps of:
receiving the character code information from the sending side;
translating the character code information from a first language of the input speech signal to a second language of the output speech signal; and
transmitting the character code information of the second language to the receiving side.

17. A receiver connected to a transmission line, comprising:
a receiving section including a character code receiver for receiving character code information representative of recognized words of an input speech signal, and a speech feature information receiver for receiving speech feature information representative of user specific speech characteristics of a speaker generating said input speech signal from the transmission line, wherein the character code information and the speech feature information are generated from an input speech signal by speech recognition, and wherein the user specific speech characteristics include a vocal tract feature of the speaker and a speed of the speech of the speaker; and
a converter for converting received character code information and speech feature information to an output speech signal providing audible speech characteristics substantially identical to the content of said input speech signal and the user specific speech characteristics of said speaker.

18. The receiver according to claim 17, further comprising:
a memory for storing at least one piece of registered speech feature information;
a searcher for searching the memory for the received speech feature information; and
a controller for producing a screening signal for a display depending on whether a match is found in the memory.

19. The receiver according to claim 18, wherein the controller disconnects communication of the receiver when no match is found.

20. The receiver according to claim 17, further comprising:
a display;
a memory for storing at least one piece of registered speech feature information and at least one piece of registered speaker information which correspond to each other;
a searcher for searching the memory for a match between the received speech feature information and the registered speech feature information; and
a controller for controlling the display in a manner that, when a match is found in the memory, registered speaker information corresponding to the matched registered speech feature information is displayed on said display.

* * * * *